United States Patent [19]

Semura et al.

[11] Patent Number: 4,879,803

[45] Date of Patent: Nov. 14, 1989

[54] METHOD FOR MOUNTING A PLURALITY OF BRUSHES

[75] Inventors: Norio Semura, Aichi; Masumi Tsuchida, Toyokawa; Yoshihiro Shimamura, Kosai, all of Japan

[73] Assignee: ASMO Co., Ltd., Kosai, Japan

[21] Appl. No.: 226,055

[22] Filed: Jul. 29, 1988

[30] Foreign Application Priority Data

Aug. 14, 1987 [JP] Japan ................................ 62-201929
Oct. 29, 1987 [JP] Japan ................................ 62-165740

[51] Int. Cl.[4] ................................ H02K 15/02

[52] U.S. Cl. ................................ 29/598; 29/413; 29/418

[58] Field of Search ................ 29/598, 413, 414, 418, 29/622; 310/239

[56] References Cited

U.S. PATENT DOCUMENTS 2,896,033 7/1959 Hartz ................................ 29/622
4,764,645 8/1988 Takasawa ................................ 29/622

FOREIGN PATENT DOCUMENTS 61-85507 6/1986 Japan .

*Primary Examiner*—P. W. Echols
*Attorney, Agent, or Firm*—Burns, Doane, Swecker & Mathis

[57] ABSTRACT

A position-detecting device is formed by mounting a plate onto a base body. The plate carries a plurality of slide terminals adapted to slide on contact paths of a cooperating member. Sections of the plate which carry respective groups of the slide terminals are interconnected by narrow portions of the plate. After the plate has been mounted on the body so as to situate the slide terminals in predetermined locations, the narrow portions are served to seperate the plate sections into the separate brushes, each having a respective group of slide terminals.

5 Claims, 11 Drawing Sheets

METHOD FOR MOUNTING A PLURALITY OF BRUSHES

BACKGROUND OF THE INVENTION

1. Field of the Invention

The present invention relates to an electric actuator, i.e., an actuator to be operated by an electric motor, and more particularly to a position-detecting apparatus for detecting a rotated position of the output shaft of an actuator for opening and closing a damper of a vehicle air conditioner so as to make it possible to stop the motor at a predetermined position by pressing an appropriate switch so as to stop the damper at a selected position. The present invention also relates to a method for fixing brushes to the position-detecting apparatuses provided with various kinds of electric actuators.

2. Description of Related Art

When a plurality of brushes are provided, for example, on a movable portion of a position-detecting apparatus, brushes are individually heat-caulked onto the flat portion of a gear mounted on an output shaft. This method is described hereinbelow with reference to FIGS. 16 through 24.

As shown in FIGS. 16 through 19, a position-detecting apparatus (S) comprises a gear 30 and brushes 40 (40*a* and 40*b*). The gear 30 comprises an output shaft 32 and a disk 33 to which brushes 40 are fixed. The output shaft 32 and the disk 33 are integrated with each other through a boss 31. As shown in FIG. 18, the outer circumferential face 33*a* of the disk 33 contains gear teeth teeth-shaped convexed, namely, gear teeth-shaped. Predetermined number of openings 34 are formed at predetermined positions of the disk 33. Supporting members 41 to be described later are inserted under pressure, or pressed into the opening 34 having a step 34*a*, respectively. The brushes 40*a* and 40*b* as shown in FIGS. 20 through 23 are fixed to the top surface of the disk 33 of the gear 30 by, for example, a heat-caulking.

The method for fixing the brushes 40 to the disk 33 is described hereinbelow taking the brush shaped as shown in FIG. 20 as an example. The supporting members 41 as shown in FIG. 22 are mounted on the brush 40*a*, and the supporting members 41 are fixed under pressure to the openings 34 formed at predetermined positions in the disk 33. The supporting members 41 are mounted on the flat portion 42 and the bent portion 43 of the brush 40*a*. The supporting member 41 comprises a portion 41*a* to be inserted under pressure into the opening 34 and a claw 41*b* which engages with a step 34*a* of the opening 34. Therefore, the supporting member 41 is prevented from being disengaged from the opening 34.

However, the position-detecting apparatus constructed by the above-described conventional method is required to be accurate in dimensions of respective brushes, in arranging the respective brushes at predetermined positions, and in the positions and dimensions of the openings formed on the disk to be used as a base body.

Further, when brushes are individually fixed to the flat portion of the disk of the gear by a heat-caulking, dimensions of projections formed on the supporting member to be heat-caulked and the dimensions of the brushes may differ from each other. As a result, the brushes are fixed to the flat portion of the disk of the gear at different angles, which causes the rotated position-detecting apparatus to detect the rotated position of the output shaft of the actuator with a low accuracy.

In addition, the fixing of the brushes to the disc one by one leads to the increase of the number of manufacturing processes.

As shown in FIG. 24, in the above-described position-detecting apparatus for detecting the position of the output shaft of the actuator for opening and closing an exhaust change-over damper, switching patterns 5*a*, 5*b*, 5*c*, 5*d*, and 5*e* connected to a switch for ventilation 4*a*, a switch for B/L 4*b*, a switch for heating 4*c*, a switch for heat/defrosting 4*d*, and a switch for defrosting 4*e* of an exhaust selection switch 4, respectively are concentrically formed on a printed body. A pair of brushes is mounted on one of both faces of a gear mounted on an output shaft in symmetrical relationship with respect to the output shaft. The slide terminals of the brushes slide on the switching patterns 5*a* through 5*e*, respectively.

In the above-described position-detecting apparatus, the position at which the actuator stops is affected in a great extent by the positions of the edges of the respective switching patterns, namely, by a manufacturing accuracy thereof. For example, if the edge position of a respective switching pattern is different from a predetermined value by "l", the angle error $\theta$ of the pattern edge, namely, the angle error which affects the stop angle of the actuator is expressed as follows:

$$\theta=\tan^{-1}l/R$$

where R is the radius of the pattern. That is, as the radius R of the pattern becomes small, the angle error of the pattern edge increases. Specifically, in FIG. 24, the usage of the pattern 5*a* allows the actuator to stop with a higher accuracy than the usage of the pattern 5*b*. Thus, when the pattern 5*e* nearest the center of a base body is operated, the actuator stops with the lowest accuracy. This is a great disadvantage of the conventional rotated position-detecting apparatus.

SUMMARY OF THE INVENTION

The present invention has been made with a view to substantially solving the above-described disadvantages.

It is an object of the present invention to provide a position-detecting apparatus in which a brush-formed plate having a plurality of brushes integrated with each other through narrow portions is fixed to a base body, and thereafter, the narrow portions are cut off.

It is another object of the present invention to provide a method for fixing brushes of a position-detecting apparatus of an electric actuator, wherein openings formed on a base body coincide with the positions of narrow portions formed on a brush-formed plate.

It is a further object of the present invention to provide a method for fixing brushes of a position-detecting apparatus of an electric actuator, wherein projections formed on the brush-fixing face of the base body are inserted through openings formed on the brush-mounted plate, and thereafter, the projections are heat-caulked.

It is a still further object of the present invention to provide a method for fixing brushes of a position-detecting apparatus of an electric actuator, wherein a base body whose outer circumferential face contains gear teeth is used.

it is a still another object of the present invention to provide a method for fixing brushes of a position-detecting apparatus of an electric actuator, wherein a base body is integrally formed of a synthetic resin.

According to the present invention, the use of the brush-formed plate in which a plurality of brushes are integrated with each other eliminates the need for considering the accuracy of, for example, the dimensions of respective brushes. Further, since the brush-mounted plate fixed to the base body is divided by cutting off the narrow portions at predetermined positions, it is unnecessary to consider the accuracy of, for example, the positions and dimensions of respective openings through which the edges of the brushes are inserted. Therefore, the position-detecting apparatus can be easily manufactured. In addition, since the positions of the openings formed on the base body correspond to the positions at which narrow portions are formed on the brush-formed plate, resulting chips can be easily removed through the openings. Furthermore, since only the brush-formed plate is required to be fixed to the base body in constructing the position-detecting apparatus, an operation can be efficiently performed, the number of assembling processes can be reduced, and an automatic assembling is easy.

Also, there is provided according to the present invention, a position-detecting apparatus in which the distance between concentrically arranged edges of respective switching patterns and the center of a base body are the same as the distance between the edge of the switching pattern arranged remote from the center of the base body and the center thereof so as to easily detect a position of the output shaft of an actuator.

In order to achieve the object, an actuator according to the present invention comprising a member to be driven connected to an output shaft to be rotated by a motor through a sped reduction mechanism, a pair of brushes mounted on a gear fixed to the output shaft in a symmetrical relationship with respect to the output shaft, a plurality of comb-shaped slide terminals provided with each of the brushes, a base body so disposed that the respective slide terminals of a pair of the brushes slide on the switching patterns, a motor which is stopped by cutting off electric current so as to stop the member to be driven at a predetermined position when the slide terminals of the brushes reach the switching patterns, wherein except the switching pattern of common terminals disposed nearest the center of the base body, all of the concentrically disposed switching patterns are so shaped that the motor-stopping edges of the switching patterns are brought into contact with a slide terminal disposed on the most outer circumference so as to stop the motor when the slide terminals of the brushes are brought out of contact with the edge of the switching pattern disposed on the most external circumference.

The above-described actuator is used to open or close the dampers of an air conditioner for use in a vehicle. According to this arrangement, the switching patterns are connected to switches for selecting damper-opening/closing positions, electric current is cut off to stop the motor when the slide terminals of the brushes reach the edge of a switching pattern connected to a switch which has been turned on, and the damper which is opened or closed by the motor through the output shaft is stopped at a predetermined position selected by the switch. Accordingly, the edge of each of the switching patterns is disposed at the most external circumference and the amount of an angle error of the edge of the switching pattern is small, and the damper can be stopped with a high accuracy, which meets the demand for a damper to stop at a very high accuracy, namely, at a predetermined position.

BRIEF DESCRIPTION OF THE DRAWINGS

These and other objects and features of the present invention will become apparent from the following description taken in conjunction with preferred embodiment thereof with reference to the accompanying drawings, in which:

FIGS. 6 through 10 show another embodiment of making a position-detecting apparatus according to the present invention in which:

FIG. 6 is a plan view of the position-detecting apparatus;

FIG. 7 is a partially cutaway side elevational view of the position-detecting apparatus;

FIG. 8 is a plan view of a gear to which brushes are mounted;

FIG. 9 is a sectional view of the position-detecting apparatus taken along line I—I in FIG. 8;

FIG. 10 is a plan view of another form of brush-formed plate;

FIGS. 12 and 13 show another embodiment of the present invention in which:

FIG. 12 is a plan view of a position-detecting apparatus;

FIG. 13 is a plan view of a brush-formed plate;

FIGS. 16 through 23 show known position-detecting apparatus, brush-formed plate, gears, and brushes in which:

FIG. 16 is a plan view of a brush-formed plate;

FIG. 17 is a partially cutaway sectional view of a position-detecting apparatus;

FIG. 18 is a plan view of a gear to which brushes are fixed;

FIG. 19 is a partial sectional view taken along line III—III of FIG. 18;

FIGS. 20 and 21 are plan views of brushes;

FIGS. 22 and 23 are side elevational views of the brushes shown in FIGS. 20 and 21.

DETAILED DESCRIPTION OF THE INVENTION

An embodiment of the present invention is described with reference to FIGS. 1 through 15.

An electric actuator according to the present invention, namely, an electric actuator for opening and closing an air conditioner for use in a vehicle detects a rotational or angular position of the output shaft of a position-detecting apparatus and stops a motor at a predetermined position selected by a switch so as to stop a damper at a selected position. In this kind of air condition for use in a vehicle, the following operations are performed. Dampers shown in FIG. 1 include an air refreshing damper (R/F) 1, air-mixing damper (A/M) 2, an exhaust change-over damper (MODE) 3. These dampers are opened or closed by an actuator. The actuator transmits the rotation of a motor to an output shaft through a gear reduction mechanism. The dampers 1, 2, and 3 are opened or closed according to the amount of rotation of the output shaft. A brush constituting a position-detecting mechanism is mounted on a gear affixed to the output shaft. A base body on which switching patterns are mounted is arranged at a position at which the switching patterns and brushes contact each other. A selection switch is connected to a switching pattern. The brushes slide on the switching patterns in unison with the rotation of the output shaft. When a brush reaches the edge of a switching pattern connected to the selection switch which is ON, electric current is cut off. As a result, the motor is stopped and the dampers are stopped at predetermined positions by operating the selection switch.

Figure 1:
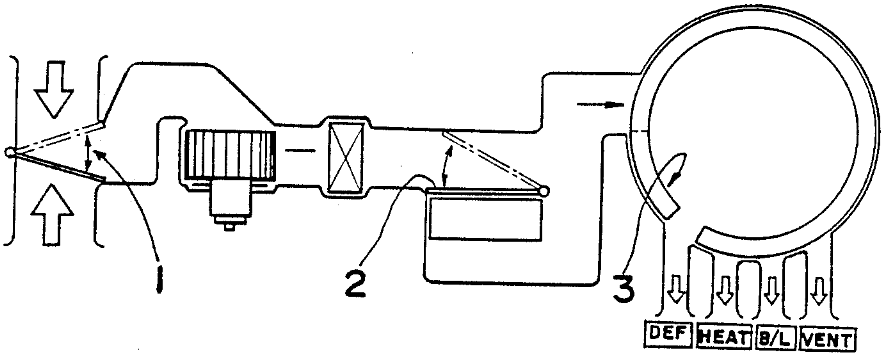
FIG. 1 is a schematic diagram showing dampers for use in a vehicle.
Figure 2:
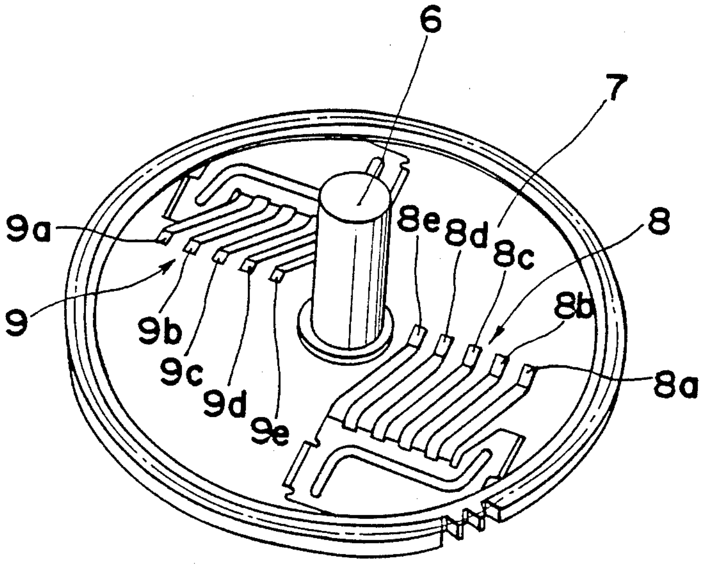
FIG. 2 is a perspective view showing a position-detecting apparatus in which brushes are fixed to a gear mounted on an output shaft.
Figure 14:
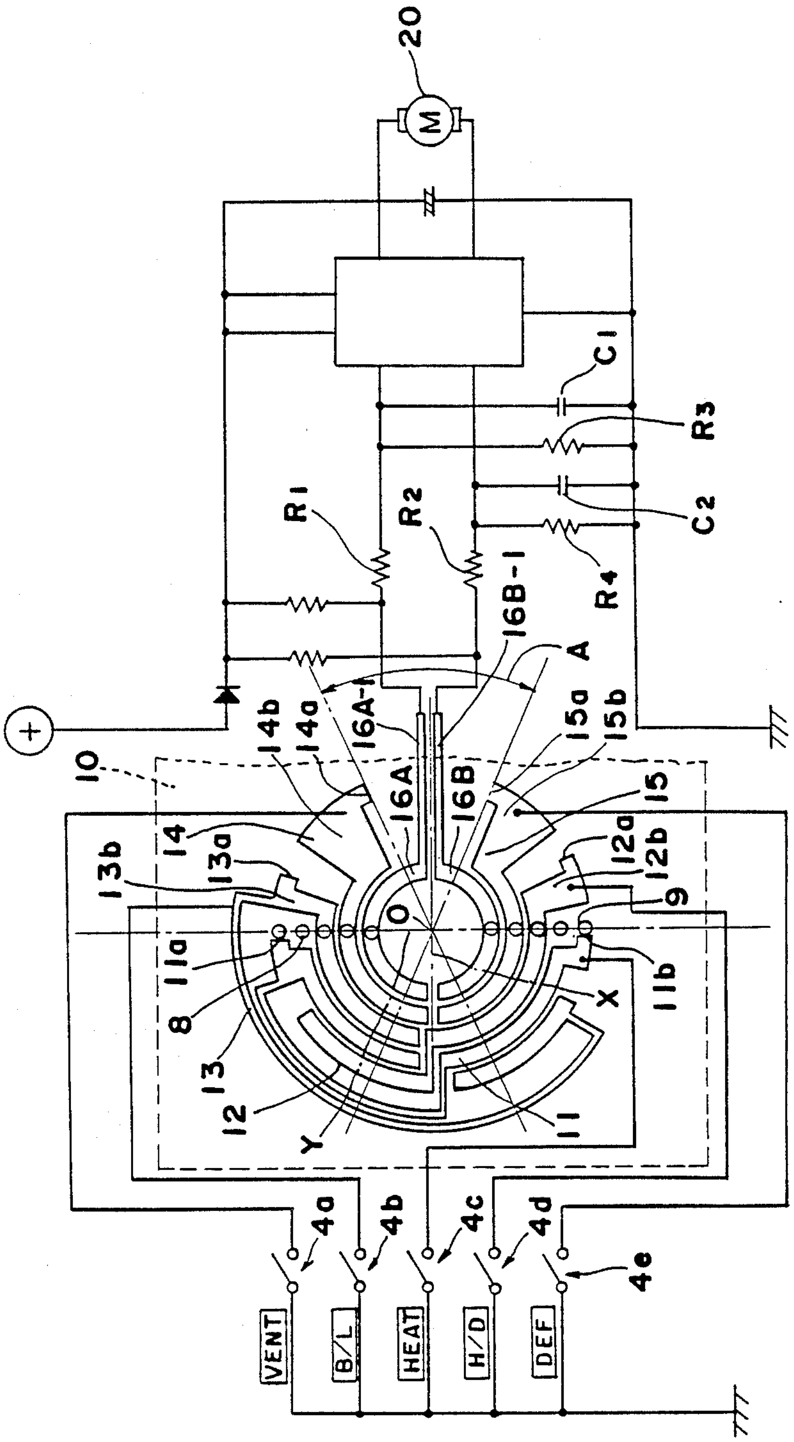
FIG. 14 is a plan view showing switching patterns and circuits of an embodiment of the present invention.
Figure 16:
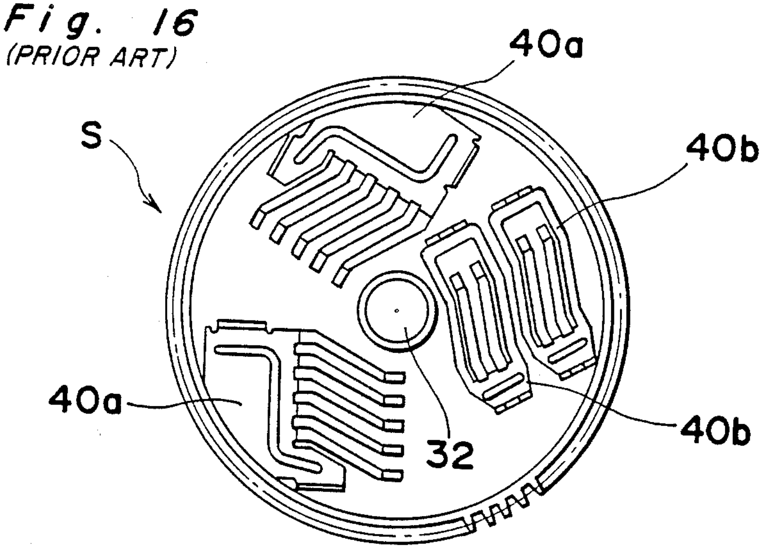
Fig. 16 (PRIOR ART)
Figure 17:
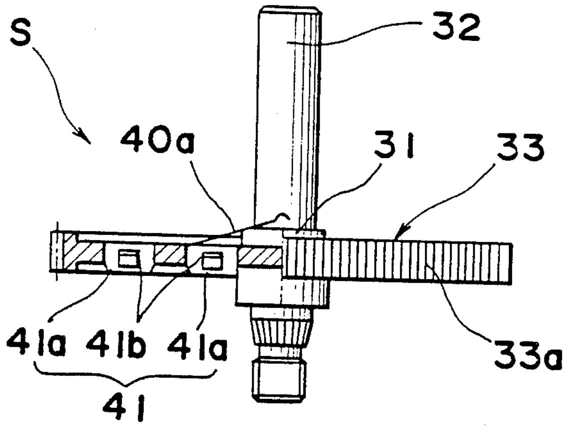
Fig. 17 (PRIOR ART)
Figure 20:
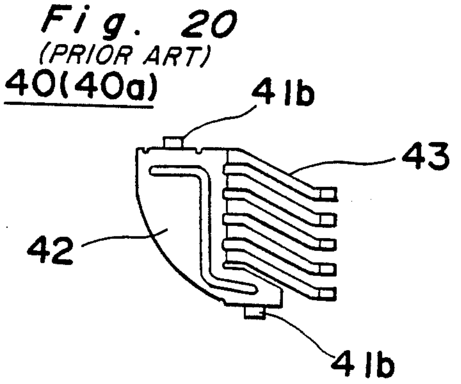
Fig. 20 (PRIOR ART)
Figure 21:
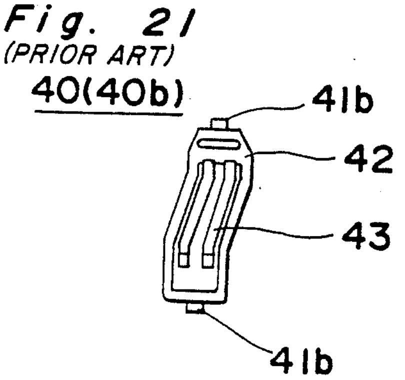
Fig. 21 (PRIOR ART)
Figure 18:
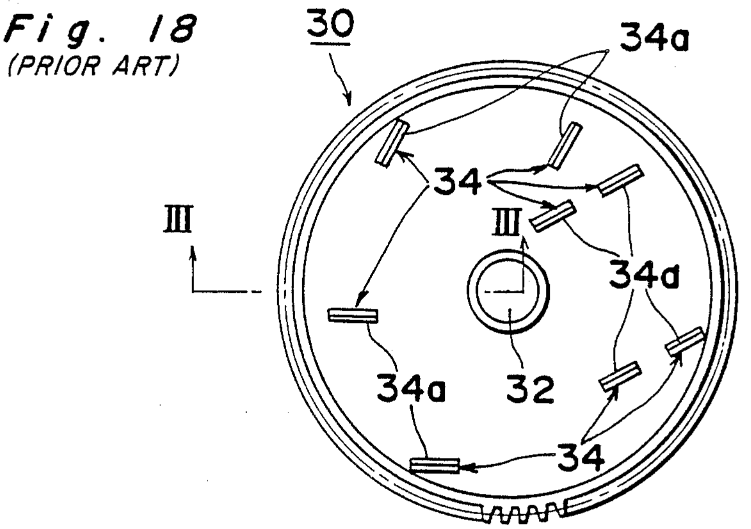
Fig. 18 (PRIOR ART)
Figure 19:
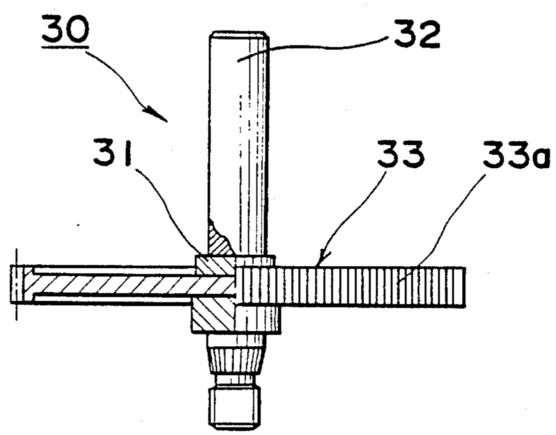
Fig. 19 (PRIOR ART)
Figure 22:
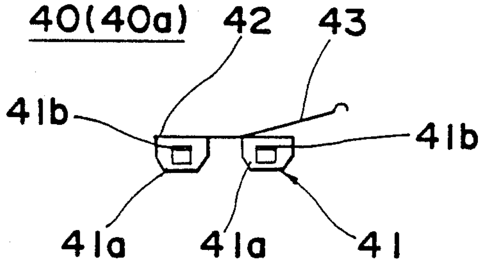
Fig. 22 (PRIOR ART)
Figure 23:
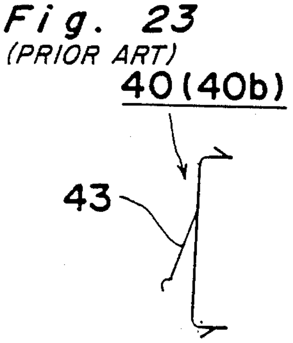
Fig. 23 (PRIOR ART)

The relationship between the brush and the switching pattern of the rotated position-detecting apparatus for detecting the output shaft of an actuator for opening and closing an exhaust change-over damper is as follows: In the case of an exhaust change-over damper, as shown in FIG. 14, switching patterns 11 through 15 connected to a switch for ventilation 4*a*, a switch for B/L 4*b*, a switch for heating 4*c*, a switch for heat/defrosting 4*d*, and a switch for defrosting 4*e* of an exhaust selection switch 4 are formed concentrically on a printed body. As shown in FIG. 2, a pair of brushes 8 and 9 is symmetrically mounted on one surface of a base body 7 fixed to an output shaft 6. Slide terminals 8*a* through 8*e* and 9*a* through 9*e* of the brushes slide on the switching patterns 11 through 15 respectively.

Figure 3:
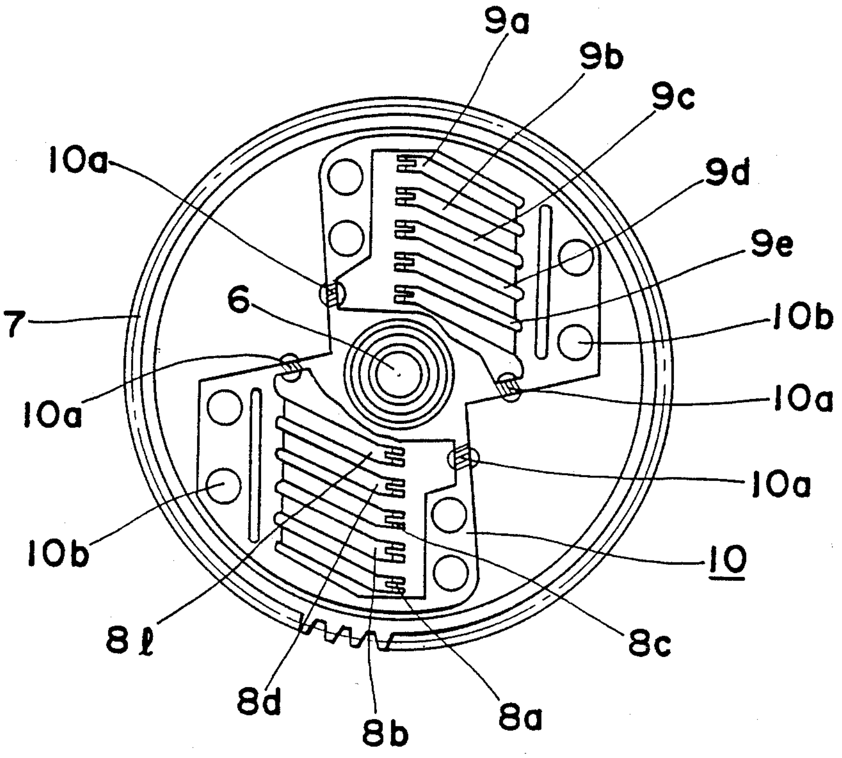
FIG. 3 is a plan view showing a first embodiment of a method of making a position-detecting apparatus.
Figure 4:
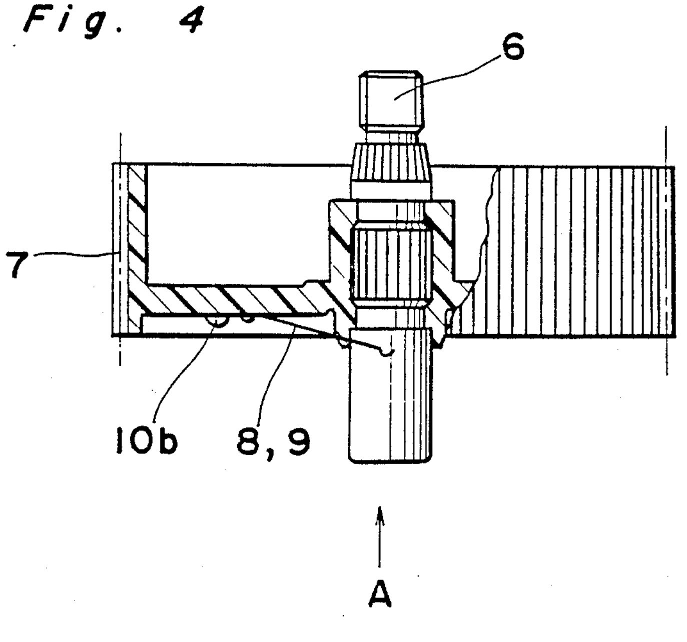
FIG. 4 is a sectional view through the position-detecting apparatus.

Referring to FIG. 3, the brush-formed plate 10 on which brushes 8 and 9 are integrated with each other is fixed to a base body 7 constituting the position-detecting apparatus. Thereafter, narrow portions 10*a* of the brush-formed plate 10 are cut off to form a plurality of mutually insulated brushes 8 and 9.

That is, the position-detecting apparatus is composed of the base body 7 and a plurality of brushes 8 and 9 fixed to the base body 7 by weldments 10*b*. Specifically, the narrow portions 10*a* are cut off.

The use of the integrated brushes 8 and 9 which form the brush-formed plate 10 eliminates the need for considering the accuracies of dimensions and positions of respective brushes when they are manufactured. The brush-formed plates 10 mounted on openings formed on the base body 7 are cut off at predetermined positions. Therefore, it is unnecessary to consider the accuracy of the dimensions or the positions of the brushes. Thus, the brushes can be more easily fixed to the brush-formed plate 10 of the position-detecting apparatus.

Figure 6:
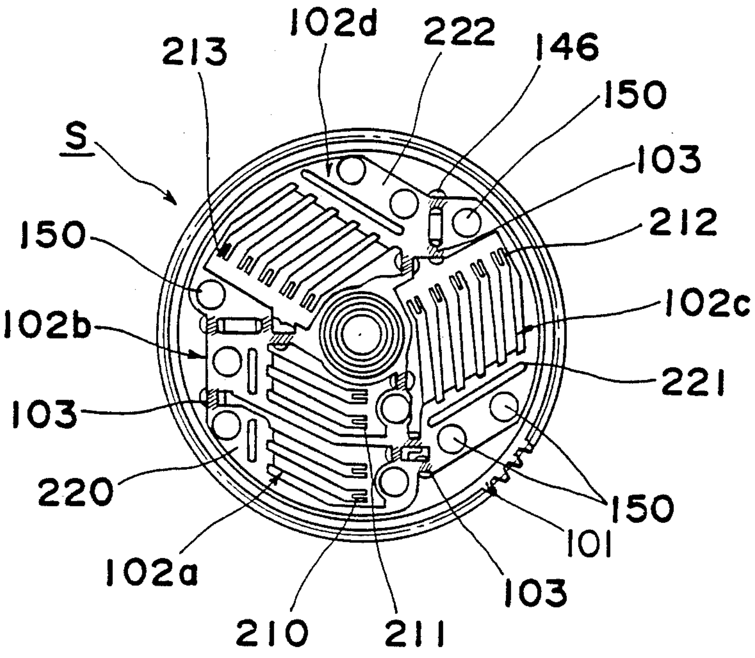

Another embodiment of the present invention is described with reference to FIGS. 6 through 11. As shown in FIG. 6, four groups of brushes are used in this embodiment. The angle formed between three angularly spaced brushes is 120° (brushes 102*a* and 102*b* are parallel with each other.) The portions of the brushes which contact with the switching patterns perform their functions provided that there are more than two, for example, three or more. It is permitted that the angles to be made by the brushes 102*a* (102*b*) and 102*c*, 102*c* and 102*d*, and 102*d* and 102*a* (102*b*) are different.

Figure 7:
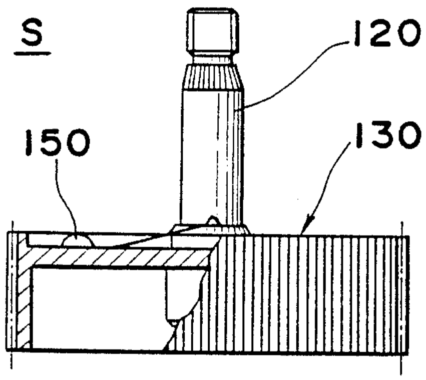

The position-detecting apparatus (S) of this embodiment comprises a gear 101 as shown in FIGS. 6 and 7 which is used as a base body and mounted on the movable portion of the position-detecting apparatus (S) and brushes 102*a* through 102*d* mounted on the gear 101.

Figure 8:
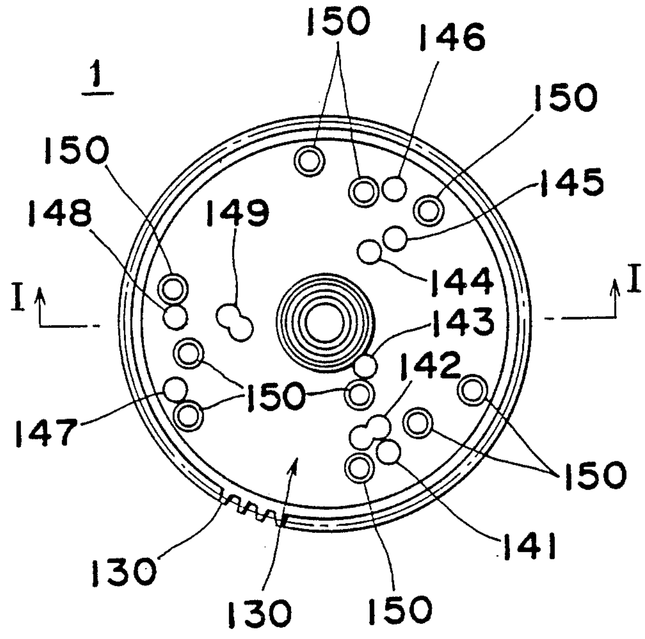
Figure 9:
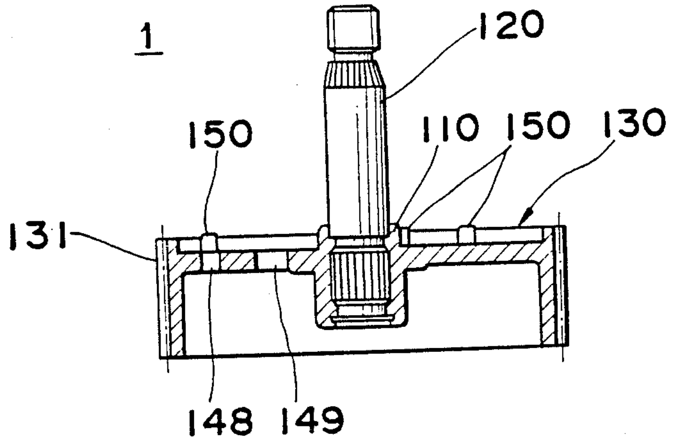

As shown in FIGS. 8 and 9, the gear 101 which functions as the base body comprises a cylinder shaft 120 which is made of a thermoplastic synthetic resin and acts as an output shaft and a disk 130 which is also made of the thermoplastic synthetic resin and fixes the brushes 102 thereto. The cylinder 120 and the disk 130 are integrally formed with each other through a boss 110. The disk 130 is rotatable because it has gear teeth formed on the outer circumferential face thereof which engage with a gear and a worm (not shown). Thus, brushes 102 rotate slidably on the switching patterns of the rotated position-detecting apparatus (S).

Openings 141 through 149 and projections 150 are formed at predetermined positions of the disk 130.

The positions of the openings 141 through 149 formed on the disk 130 correspond to the positions of a brush-formed plate 200 to be cut off. The number of the openings formed thereon also corresponds to that of the brush-formed plate 200 to be cut off. The brush-formed plate 200 is described later. Since four brushes are formed by cutting off narrow portions 103 in this embodiment, the openings 141 through 149 are formed at predetermined positions as shown by reference numerals 141 through 143, 144 through 146, and 147 through 149. The areas of the openings shown by reference numerals 142 and 149 are greater than the other openings 140 because the brush-formed plate 200 is cut off at positions in consideration of the dimensions of the openings 142 and 149, which is described later.

Projections 150 formed on the disk 130 are inserted through openings 250 formed on the brush-formed plate 200 which is to be described later. Therefore, the number and positions of the projections 150 and the openings 250 correspond with each other. In this embodiment, the number of the projections 150 and the openings is 10, respectively and the diameters of the openings 250 are a little greater than those of the projections 150.

Figure 10:
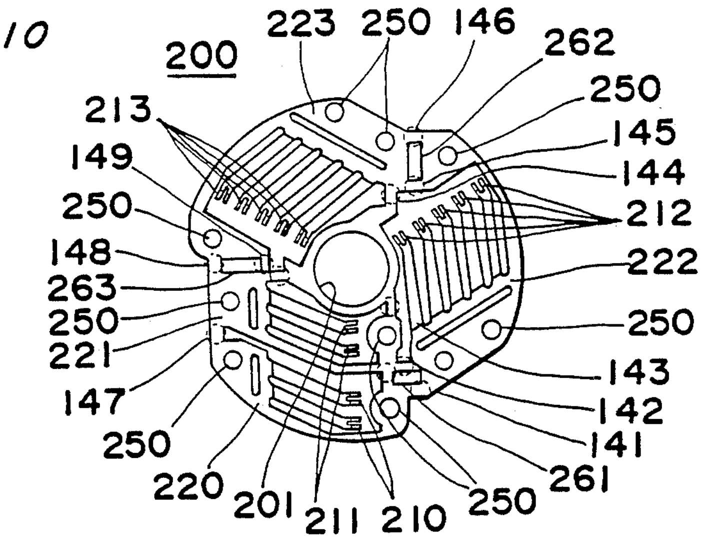
Figure 11:
FIG. 11 is a side elevational view of FIG. 10.

Referring to FIGS. 10 and 11, the brush-formed plate 200 is a conductive metal plate having a spring-like elasticity. The brush-formed plate 200 is formed as one piece. Specifically, an opening 201 for inserting the cylinder 120 therethrough is formed in the center of the brush-formed plate 200 by a press, and predetermined number of portions which contact with switching patterns are formed thereon. That is, when the brush-formed plate 200 is formed, the peripheries of the opening 201 and the contact portions 210 through 213 are punched. In this embodiment, the angles between the contact portions 210 (211) and 212, 212 and 213, and 213 and 210 (211) are 120°, respectively. As shown in FIG. 11, the base portions of the contact portions 210 through 213 are integral with fixed portions 220 through 223, respectively. The contact portions 210 through 213 extend upward from the brush formed plate 200. When the brush-formed plate 200 is formed by the press, the openings 250 through which the projections 150 of the disk 130 are to be inserted are punched through the fixed portions 220 through 223. The number of the openings 250 is the same as that of the projections 150.

As described above, the opening 201 of the brush-formed plate 200 fits over the boss 110, and the projections 150 are inserted through the openings 250 of the brush-formed plate 200. Accordingly, the brushes can be fixed to the gear 101 at predetermined positions thereof.

As shown in FIG. 10, cut-outs 261, 262, and 263 are formed on the brush-formed plate 200 so that the brushes comprising the contact portions 210, 211, 212, and 213 and fixed-contact portion 220, 221, 222, and 223 integrated with the contact portions 210 through 213, respectively are easily cut out from each other. In this embodiment, the portions 261, 262, 263 correspond to the narrow portions 103 (refer to oblique lines in FIG. 6) connecting the respective brushes 102*a*, 102*b*, 102*c*, and 102*d*.

The method for assembling the rotated position-detecting apparatus (S) by fixing the brush-formed plate 102 having the above-described construction to the gear 101 so as to form the brushes 102*a*, 102*b*, 102*c*, and 102*d* is described hereinbelow.

The brush-formed plate 200 is mounted on the gear 101 in the following manner: The output shaft 120 is inserted into the opening 201 of the brush-formed plate 200. The output shaft 120 is supported by the boss 110 formed in the center of the gear 101, and the projections 150 formed on the gear 101 are inserted into the openings 250 of the brush-formed plate 200. In this embodiment, since the boss 110 and the opening 201 of the brush-formed plate 200 are formed in the center of the gear 101 and the brush-formed plate 200, respectively, the brush-formed plate 200 and the gear 101 are firmly fixed to each other. The projections 150 of the gear 101 are caulked by heating or ultrasonic wave so that the gear 101 and the brush-formed plate 200 are firmly fixed to each other. As shown in FIGS. 6, 8, and 10, the respective fixed portions integral with the contact portions are fixed to the gear 101 at two positions or more in this embodiment when the integrated brushes 200 are separated from each other so that the brushes 200 are prevented from being shaken and rotated relative to the gear 101 acting as the base body. This method of fixing the brush-formed plate 200 to the gear 101 allows gaps intentionally provided between the projections 150 of the gear 101 and the openings 250 of the brush-formed plate 200 to be filled with a melted synthetic resin.

After the brush-formed plate 200 is fixed to the gear 101, the narrow portions 103 (refer to the oblique lines in FIG. 6) are cut off by, for example, a laser beam to form insulated sets of brushes comprising the contact portions 210, 211, 212, and 213 and the fixed portions 220, 221, 222, and 223, respectively. Since the positions of those narrow portions 103 of the brush-mounted plate 200 coincide with the positions of the openings 141 through 149 formed on the disk 130, resulting chips produced when the narrow portions 103 are cut off are removed through the openings 141 through 149, which prevents the deformation of the resin of the disk 130.

In this embodiment, the brushes are fixed to the gear 101 by inserting the projections 150 of the disk 130 through the openings 250 of the brush-formed plate 200. In addition, projections or concaves may be formed on the boss 110 and concave cut-outs in which the projections are fitted or gables which are fitted in the concaves may be formed on the brush-formed plate 200.

Another embodiment is described with reference to FIGS. 12 and 13. In this embodiment, brushes are mounted on a base body which is a fixed portion of a rotated position-detecting apparatus.

Figure 13:
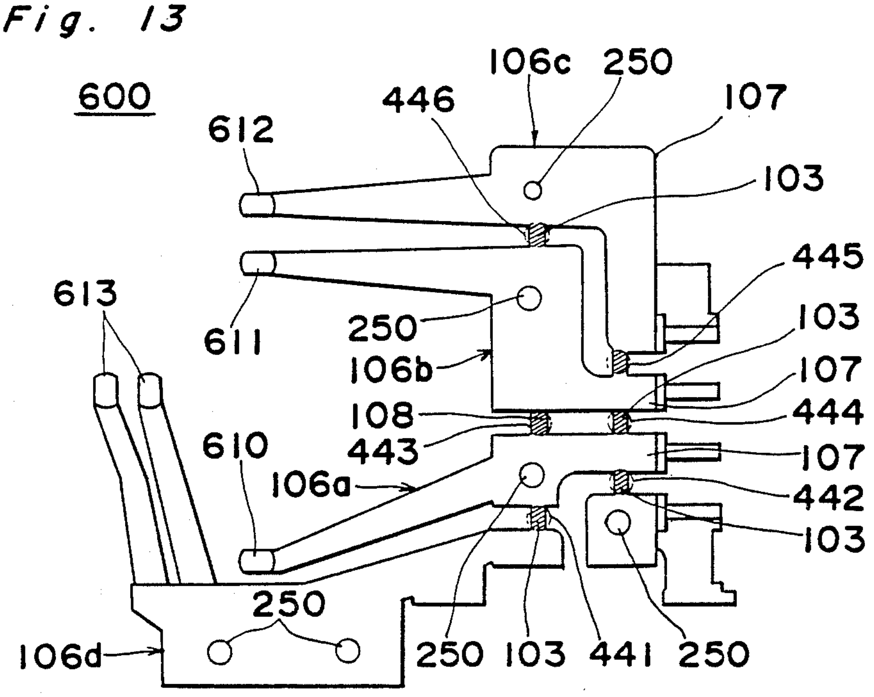
Figure 12:
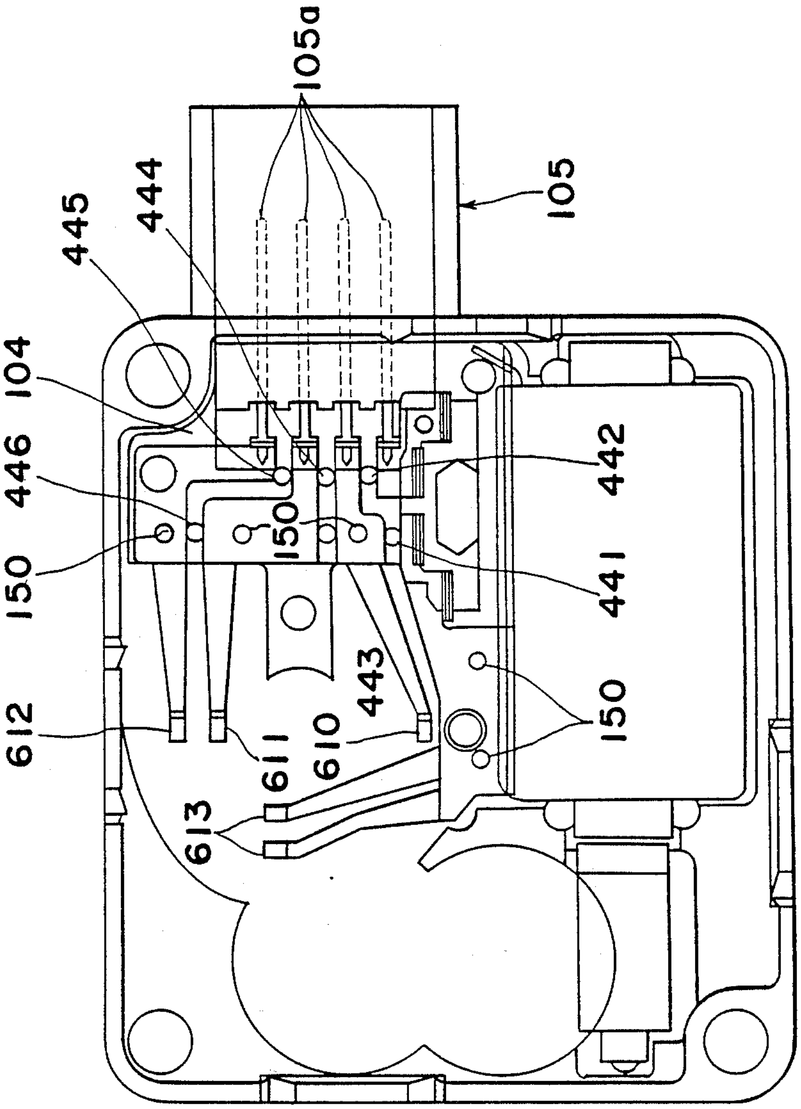

As shown in FIGS. 12 and 13, a base body 104 and a connector 105 made of resins are integrated with each other. The position-detecting apparatus is formed by connecting the connection terminals 105*a* of the connectors 105 and the base portions 107 of the brushes 106 (106*a*, 106*b*, 106*c*, and 106*d*). As shown in FIG. 13, a brush-formed plate 600 is divided into four brushes 106*a*, 106*b*, 106*c*, and 106*d* having contact portions 610, 611, 612, and 613, respectively. Narrow portions 103 connect the brushes 106*a*, 106*b*, 106*c*, and 106*d* with each other.

As shown in FIG. 12, the positions of six openings 441 through 446 formed on the base body 104 coincide with the positions of narrow portions 103 when the brush-formed plate 600 is fixed to the base body 104. The procedure of fixing the brushes 106*a*, 106*b*, 106*c*, and 106*d* to the base body 104 having the above-described construction is the same as that of the embodiment described hereinabove.

As apparent from the foregoing description, since the brush-formed plate having a plurality of brushes integrated with each other is used, it is unnecessary to consider accuracy of the dimensions of the respective brushes when they are manufactured. Further, since the positions of the narrow portions of the brush-formed plate coincide with the positions of the openings of the gear so as to divide the brush-formed plate into predetermined number of brushes, it is unnecessary to consider the accuracy of the dimensions of the openings into which the brushes are inserted, i.e., the brushes are easily fixed to the base body of the rotated position-detecting apparatus.

Further, since the brush-formed plate fixed to the base body is divided by cutting off the narrow portions at predetermined positions, it is unnecessary to consider the accuracy of, for example, the positions and dimensions of respective openings through which the edges of the brushes are inserted, which is different from the conventional method. Therefore, the rotated position-detecting apparatus can be easily manufactured. In addition, since the positions of the openings forms on the base body correspond to the positions of the narrow portions formed on the brush-formed plate, resulting chips can be easily removed through the openings. Furthermore, since only the brush-formed plate is required to be fixed to the base body in constructing the rotated position-detecting apparatus, an operation can be efficiently performed, the number of assembling processes can be reduced, and an automatic assembling is easy.

Figure 5:
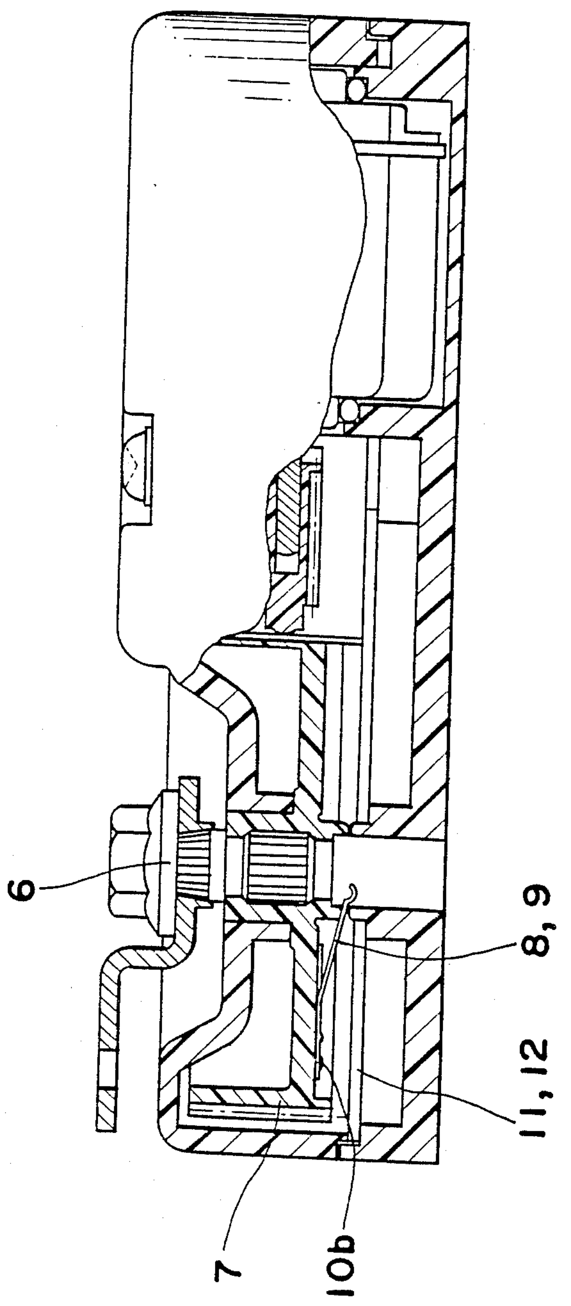
FIG. 5 is a sectional view of an actuator with which a position-detecting apparatus is provided.

As shown in FIG. 5, an actuator according to the present invention comprises a member to be driven connected to an output shaft to be rotated by a motor through a speed reduction mechanism, and a pair of brushes 8 and 9 mounted on a gear 7 fixed to the output shaft 6 in a symmetrical relationship with respect to the output shaft. Each brush comprises a plurality of comb-shaped slide terminals arranged to the slide on the switching patterns 11 and 12. Also provided is a motor which is stopped by cutting off electric current so as to stop the member to be driven at a predetermined position when the slide terminals of the brushes reach the switching patterns. Except for the switching pattern of the common terminals disposed nearest the center of the base body, all of the concentrically disposed switching patterns are so shaped that the motor-stopping edges of the switching patterns are brought into contact with a slide terminal disposed on the most outer circumference so as to stop the motor when the slide terminals of the brushes are brought out of contact with the edge of the switching pattern disposed on the most external circumference.

The above-described actuator is used to open or close the dampers of an air conditioner for use in a vehicle. According to this arrangement, the switching patterns are connected to switches for selecting damper-opening/closing positions. Electric current is cut off to stop the motor when the slide terminals of the brushes reach the edge of a switching pattern connected to a switch which has been turned on, and the damper which is opened or closed by the motor through the output shaft is stopped at a predetermined position selected by the switch. Accordingly, the edge of each of the switching patterns is disposed at the most external circumference and the amount of an angle error of the edge of the switching pattern is small, and the damper can be stopped with a high accuracy, which meets the demand for a damper to stop with a very high accuracy, namely, at a predetermined position.

Referring to FIG. 14, still another embodiment is described. Circular switching patterns 11, 12, 13, 14, and 15 are concentrically formed on a printed board 10 about a center "O" and the end portions of the respective switching patterns 11 through 15 project radially outwardly so that the edges **11*a* (11*b*), 12*a*, 13*a*, 14*a*, and 15*a* thereof are brought into contact with the slide terminal 8*a* of the brush 8 and the slide terminal 9*a* of the brush 9 relatively remotely from the output shaft 6 shown in FIG. 2. As shown in FIG. 14, the switching pattern 11 is connected to a switch for heating 4*c* of an exhaust change-over switch 4, the switching pattern 12 is connected to a switch for heating/defrosting 4*d* thereof, the switching pattern 13 is connected to a switch for B/L 4*b* thereof, the switching pattern 14 is connected to a switch for ventilation 4*a* thereof, and the switching pattern 15 is connected to a switch for defrosting 4*e* thereof. Switching patterns 16A and 16B acting as common terminals are formed internally from the switching patterns 14 and 15 nearest the center "O". The halfcircular common terminals 16A and 16B are symmetrical with each other with respect to a line X. Connection portion 16A-1 projects from one of the ends of the common terminal 16A and the connection portion 16B-1 project from one of the ends of the common terminal 16B. Both connection portions 16A-1 and 16B-1 are connected to a motor 20**.

The switching pattern 11 connected to the switch for heating **4*c* is disposed in the left from a line "Y" passing through the center "O" and perpendicular to the line "X", and a slight gap is provided between the edge 11*a* of the switching pattern 11 and the line "Y", and a slight gap is also provided between the edge 11*b* thereof and the line "Y". When a pair of the brushes 8 and 9 shown in FIG. 2 is on the line "Y", none of the slide terminals 8*a* through 8*e* and the slide terminals 9*a* through 9*e* contact with the edges 11*a* and 11*b* of the switching pattern 11. One of the end portion of the switching pattern 12 is in the right from the line "Y" and the outer line of a cam 12*b* is disposed on the same circumference as the outer line of the edge 11*b*. The edge 12*a* projecting from the cam 12*b* acts as a stopping edge. Similarly, one of the end portion of the switching pattern 13*a* is in the right from the line "Y", and the outer line of a cam 13*b* is on the same circumference as the outer line of the edge 11*a* of the switching pattern 11. The edge 13*a* projecting from the cam 13*b* acts as a stopping edge. The switching patterns 14 and 15 formed internally from the switching patterns 12 and 13 are symmetrical with each other with respect to the line "X", and cams 14*b* and 15*b* are in the right from the line "Y", and the outer lines of cams 14*b* and 15*b* are on the same circumference as the edge 11*a* (11*b*). The edges 14*a* and 15*a* projecting from the cams 14*b* and 15*b***, respectively act as stopping edges.

Thus, the outer lines of the respective edges **11*a* (11*b*), 12*a*, 13*a*, 14*a*, and 15*a* of the switching patterns 11 through 15** are on the most outer circumference.

The brush 8 which slides on the switching patterns contact with none of the switching patterns when the brush 8 is disposed between the edge **14*a* of the switching pattern 14 and the line "X". Accordingly, electric current does not flow through the rotated position-detecting apparatus. As a result, the rotation of the brush 8 is stopped. Similarly, when the brush 9 is disposed between the edge 15*a* of the switching pattern 15 and the line "X", no electric current flows through the rotated position-detecting apparatus. As a result, the rotation of the brush 9 is stopped, i.e., the brushes do not rotate when they are in the range "A" shown in FIG. 14. The slide terminal 8*a* disposed at the most outer circumference of the brush 8 slides on the edge 11*a* and in the vicinity of the edge 11*a* of the switching pattern 11, the cams 13*b* (edge 13*a*) of the switching pattern 13 and 14*b* (edge 14*a*) of the switching pattern 14. The slide terminal 9*a* disposed at the most outer circumference of the brush 9 slides on the edge 11*b* and in the vicinity of the edge 11*b*) of the switching pattern 11, the cam 12*b* (edge 12*a*) of the switching pattern 12 and the cam 15*b* (edge 15*a*) of the cam 15. The slide terminal 8*b* slides on the switching pattern 11. The slide terminal 8*c* slides on the switching pattern 13. The slide terminal 8*d* slides on the switching pattern 14. The slide terminal 9*b* slides on the switching pattern 11. The slide terminal 9*c* slides on the switching pattern 12. The slide terminal 9*d* slides on the switching pattern 15. The slide terminal 8*e* disposed nearest the output shaft 6 slides on the common terminal 16A. The slide terminal 9*e* nearest the output shaft 6 slides on the common terminal 16B**.

The circuit connecting the common terminal 16A and the motor 20 and the circuit connecting the common terminal 16B and the motor 20 are provided with a resistor $R_1$ and a capacitor $C_1$, and a resistor $R_2$ and a capacitor $C_2$, respectively so as to prevent a chattering. The circuits are also provided with resistors $R_3$ and $R_4$, respectively so that resistances are generated during a discharge.

The operation of the position-detecting apparatus is described hereinbelow. When the switch for defrosting **4*e* of the exhaust change-over switch 4 is turned on, some of the slide terminals 9*a* through 9*d* of the brush 9 slide on the switching pattern 15. Accordingly, electric current flows through the motor 20, so that the motor 20 is rotated. At this time, only the slide terminal 9*d* contacts with the switching pattern 15 before the brush 9 reaches the cam 15*b* of the switching pattern 15. When the brush 9 has reached the cam 15*b* and the edge 15*a*, the slide terminals 9*a* through 9*d* contact with the cam 15*b*. When the brush 9 reaches the edge 15*a*, only the slide terminal 9*a* contacts with the edge 15*a*. Thereafter, the slide terminal 9*a* is brought out of contact with the edge 15*a*. As a result, the motor 20 is stopped because electric current does not flow therethrough and at the same time, the output shaft 6 to be driven by the motor 20 is stopped, which causes the brushes 8 and 9 to stop. When the other switches are turned on, operations similar to the above occur, i.e., when the slide terminals 8***a* of the brush 8 or the slide terminal 9*a* of the brush 9 remotest from the output shaft 6 is brought out of contact with the edges of the switching patterns 11 through 15, electric current does not flow through the motor 20. As a result, the motor 20 is stopped, which causes the damper (not shown) to stop at a predetermined position in association with the stop of the motor 20.

As described above, since the stopping edges of the switching patterns 11 through 15 are so shaped that they contact with the slide terminal disposed remotely from the center, the position at which the output shaft of the actuator has stopped can be reliably detected. Accordingly, the motor can be stopped with a high accuracy.

Figure 15:
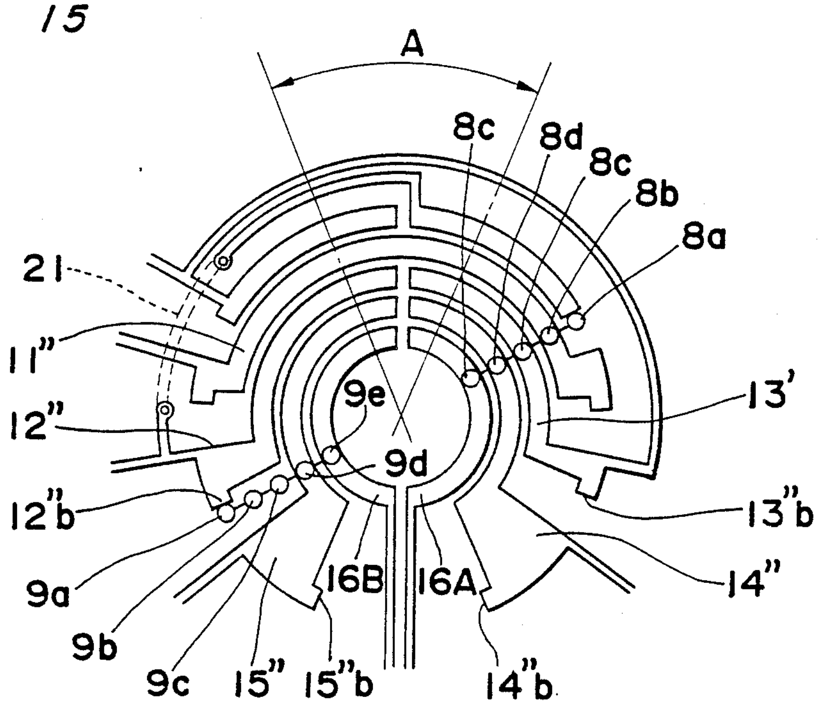
FIG. 15 is a plan view showing switching patterns of an embodiment of the present invention.
Figure 24:
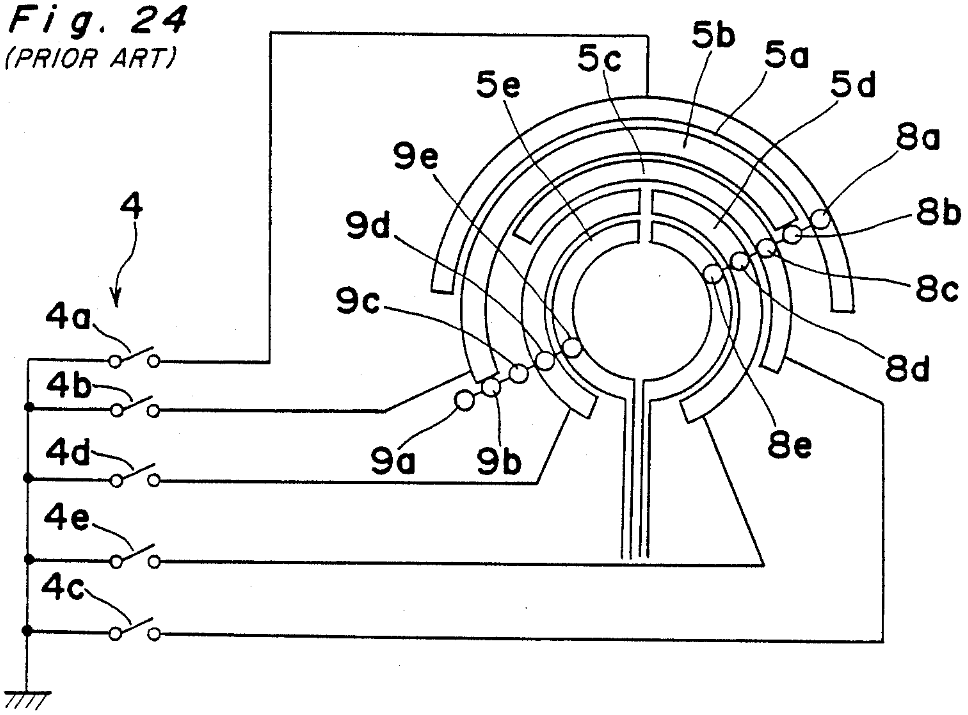
Fig. 24 (PRIOR ART)
FIG. 24 is a plan view of known switching patterns.

The configurations of the switching patterns 11 through 15 are not limited to those described in the embodiment as shown in FIG. 14. As shown in FIG. 15, in order to prevent switching patterns from overlapping with each other, a switching pattern 21 provided on the back surface of the printed board may be connected to a switching pattern 12" provided on the front surface thereof. The use of the switching pattern 21 may be replaced with a jumper line such as a lead wire. It is necessary, however, that the stopping edge of each of the switching patterns is disposed at a position at which the stopping edge contacts with a slide terminal disposed on the most outer circumference.

As apparent from the foregoing description, in the rotated position-detecting apparatus according to the present invention, since the stopping edge of each of the concentrically arranged switching patterns which contacts with a brush is disposed on the most outer circumference of the base body, the position at which the output shaft of the actuator has stopped can be reliably detected. Accordingly, the motor can be stopped with a high accuracy and the rotated position-detecting apparatus can be preferably used for the damper-opening/closing apparatus of an air conditioner for use in a vehicle.

What is claimed is:

1. A method for mounting a plurality of brushes in a mechanism for detecting a rotational position of an actuator, said mechanism including a base body adapted to be affixed to a motor driven output shaft of the actuator, each of said brushes including a group of comb-shaped slide terminals, said brushes mounted on said base body in generally symmetrically relationship such that said slide terminals are adapted to slide on switching patterns and cause the motor to stop upon said slide terminals reaching edges of the switching patterns, said method comprising the steps of:

providing said slide terminals on a common plate having narrow portions interconnecting sections of said plate containing respective groups of said slide terminals, mounting said plate fixedly on a surface of said base body in a preselected position, and severing said narrow portions of said plate to separate said plate sections from one another.

2. A method according to claim 1 including the step of providing said surface of said base body with openings arranged to be superimposed relative to said narrow portions, whereby the narrow portions enter said openings upon being severed.

3. A method according to claim 1, wherein said surface of said base body includes projections, said plate including openings which are inserted onto respective ones of said projections when said plate is mounted on said surface, and thereafter said projections are heat-caulked.

4. A method according to claim 1 including providing said base body with gear teeth.

5. A method according to claim 1 including forming said base body of synthetic resin.

* * * * *